Nov. 26, 1929.  A. T. WHELAN  1,736,957
OPERATING TABLE
Filed Oct. 19, 1927

INVENTOR.
Andrew T. Whelan.
BY Parsons & Bodell,
ATTORNEYS.

Patented Nov. 26, 1929

1,736,957

UNITED STATES PATENT OFFICE

ANDREW T. WHELAN, OF SYRACUSE, NEW YORK

OPERATING TABLE

Application filed October 19, 1927. Serial No. 227,077.

This invention has for its object a pan particularly adapted to be used with the head rest of an operating or embalming table and particularly embalming tables whereby the matter drawn from the body drains into the pan from which it runs out from an outlet without coming in contact with the body after it enters the pan.

The invention consists in the novel features and in the combinations and constructions hereinafter set forth and claimed.

In describing this invention, reference is had to the accompanying drawings in which like characters designate corresponding parts in all the views.

Figure 1:
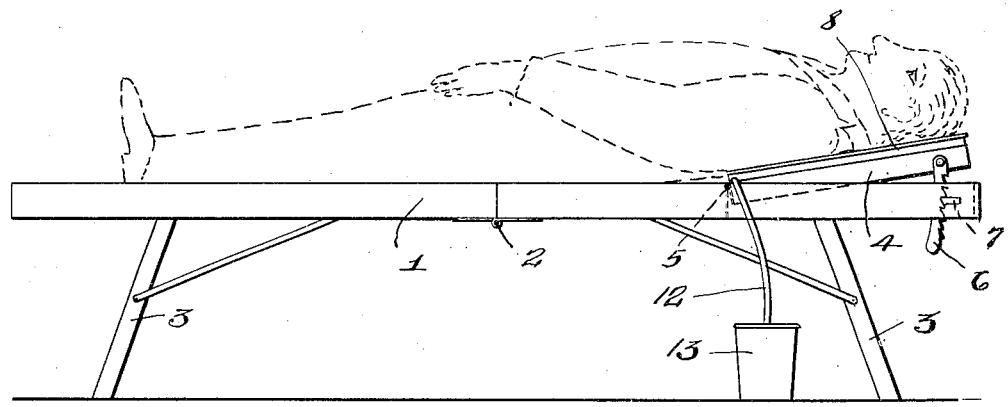
Figure 1 is a side elevation of an embalming table embodying my invention.
Figure 2:
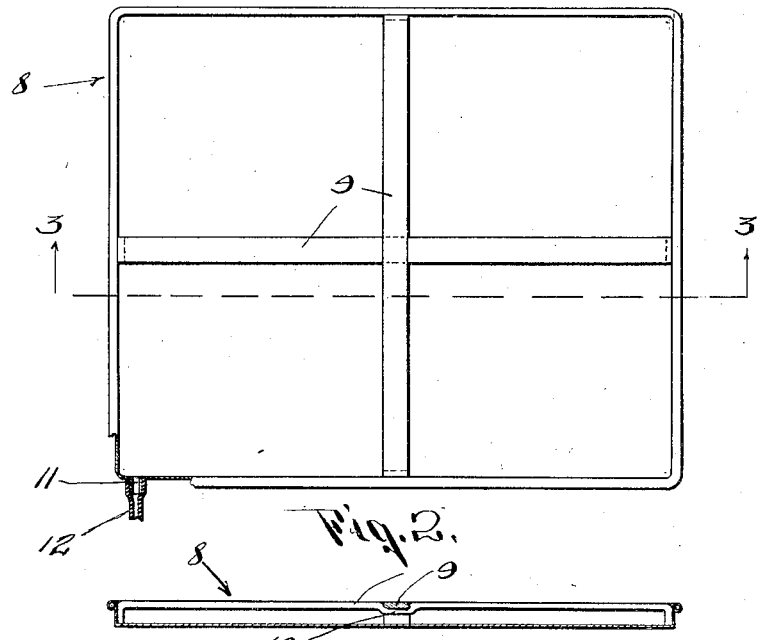
Figure 2 is a plan view of the head rest.
Figure 3:
Figure 3 is a sectional view on line 3—3 Figure 2.

This invention comprises generally a shallow pan mountable upon the adjustable head rest of an operating or embalming table and having means at its top for supporting the body or the head and shoulders thereof off the bottom of the pan.

1 designates the table. The table may be of any suitable form, size or construction. The table 1 here being shown as formed in sections hinged together at 2 in order that it may be folded up, and collapsible legs 3 supporting the top.

4 designates the head rest which is hinged or fulcrumed at one end at 5 to the top, its other end being adjustable vertically to arrange said pan at different angles. As here shown the head rest is formed with a rack 6 for engaging a suitable stationary shoulder 7 on the table.

8 is a shallow pan mountable on the head rest and provided with open framework which supports the head and shoulders of the body off the bottom of the pan. The framework is here shown as consisting of flat bars 9 extending diametrically of the pan and at right angles to each other, and having down-turned ends resting on the bottom of the pan. One of the bars where the bars intersect is depressed at 10 to form a passage for the other bar so that the upper faces of the bars are flush. The pan is formed with an outlet 11 at its hinged end to which a tube 12 can be connected in order that the matter drawn from the body may run from the pan into the receptacle 13 and not collect in the pan.

In preparing a body for embalming, a draining tube is inserted in a vein in the breast near the neck, and in pumping out the blood, matter runs from the mouth and nose of the body. This matter has heretofore accumulated on the head rest smearing the body. By my invention, the shallow pan is placeable on the headrest under the head and shoulders of the body, and as the head and shoulders are supported off the bottom of the pan, the greater part of the matter runs into the pan and out through the outlet into the receptacle and does not come in contact with the body after dropping on the head rest, that is, after running into the pan. It is obvious that this pan can be used in private houses when an embalming table is not available as it is comparatively small and light and is easily transported. It is also durable in use and can be manufactured at a very small cost.

What I claim is:

A receptacle for the purpose described comprising a shallow pan having a flat bottom of a size to place under the head and shoulders of a body and having an outlet in one of its sides and means flush with the top of said pan and integral therewith for supporting the head and shoulders of the body off the bottom thereof comprising flat bars extending diametrically of the pan and at right angles to each other and having down-turned ends resting on the bottom of the pan, one of said bars being depressed where the bars intersect, to form a passage for the other bar so that the upper faces of the bars are flush.

In testimony whereof, I have hereunto signed my name, at Syracuse, in the county of Onondaga and State of New York, this 8th day of October, 1927.

ANDREW T. WHELAN.